United States Patent [19]

Asada et al.

[11] Patent Number: 4,830,457
[45] Date of Patent: May 16, 1989

[54] OPTICAL CABLE CONNECTING SECTION IN ELECTRIC POWER AND OPTICAL COMPOSITE CABLE

[75] Inventors: Yoshihisa Asada; Masahiro Iizuma, both of Ichihara, Japan

[73] Assignee: The Furukawa Electric Co., Ltd., Tokyo, Japan

[21] Appl. No.: 127,394

[22] Filed: Dec. 2, 1987

[30] Foreign Application Priority Data

Dec. 5, 1986 [JP] Japan .................. 61-288750

[51] Int. Cl.⁴ .............................. G02B 6/36
[52] U.S. Cl. ................. 350/96.20; 350/96.21; 350/96.23; 174/70 R
[58] Field of Search ........... 350/96.20, 96.21, 96.22, 350/96.23; 174/70 R

[56] References Cited

U.S. PATENT DOCUMENTS

| | | | |
|---|---|---|---|
| 4,087,157 | 5/1978 | Hodges | 350/96.21 |
| 4,154,049 | 5/1979 | King et al. | 350/96.23 X |
| 4,205,899 | 6/1980 | King et al. | 350/96.23 |
| 4,381,140 | 4/1983 | Van der Hoek et al. | 350/96.23 |
| 4,498,732 | 2/1985 | Campbell et al. | 350/96.20 |
| 4,552,432 | 11/1985 | Anderson et al. | 350/96.23 |
| 4,585,305 | 4/1986 | Chazelas et al. | 350/96.21 |
| 4,601,536 | 7/1986 | Guazzo | 350/96.20 |
| 4,737,010 | 4/1988 | Le Maitre et al. | 350/96.20 |
| 4,767,173 | 8/1988 | Priaroggia | 350/96.20 |

FOREIGN PATENT DOCUMENTS

| | | | |
|---|---|---|---|
| 0092441 | 10/1983 | European Pat. Off. | 350/96.20 |
| 3011429 | 10/1981 | Fed. Rep. of Germany | 350/96.20 |
| 57-78011 | 5/1982 | Japan | 350/96.23 |
| 57-148713 | 9/1982 | Japan | 350/96.20 |
| 57-190906 | 11/1982 | Japan | 350/96.23 |
| 58-54309 | 3/1983 | Japan | 350/96.20 |
| 58-42010 | 3/1983 | Japan | 350/96.20 |
| 59-31917 | 2/1984 | Japan | 350/96.20 |
| 60-212709 | 10/1985 | Japan | 350/96.20 |
| 61-113005 | 5/1986 | Japan | 350/96.23 |
| 61-112105 | 5/1986 | Japan | 350/96.20 |
| 62-209404 | 9/1987 | Japan | 350/96.23 |

Primary Examiner—William L. Sikes
Assistant Examiner—Brian M. Healy
Attorney, Agent, or Firm—Foley & Lardner, Schwartz, Jeffery, Schwaab, Mack, Blumenthal & Evans

[57] ABSTRACT

An optical cable connecting section in an electric power and optical composite cable which has a rodlike excessive length containing member having linear grooves and curved grooves on the outer periphery thereof and disposed between the ends of both of the optical cables to be connected, further connected in series with the tension members of the optical cables in such a manner that the optical fibers led from the end of both of the optical cables are relatively connected as pairs, whereby the excessive length portions of the optical cables thus connected are contained in the curved grooves of the excessive length containing member and the portions having no excessive length are contained in the linear grooves of the excessive length containing member. Thus, the connecting sections of the optical cables can improve in the outer diameter of the connecting sections of the optical cables so as to increase as large as the occurrence of a defect in its handling to be uniformly finished in the outer diameter of the cable over the entire length.

20 Claims, 2 Drawing Sheets

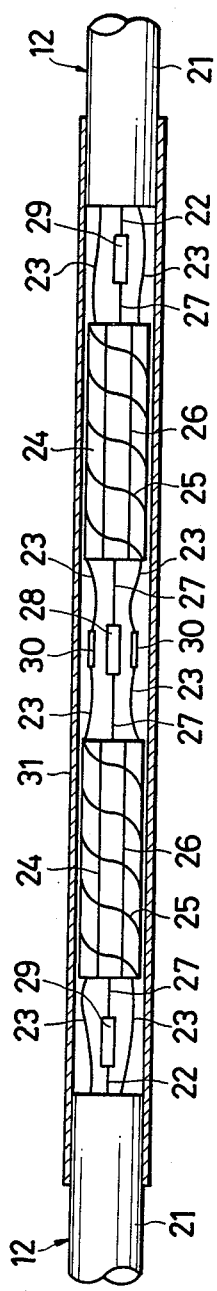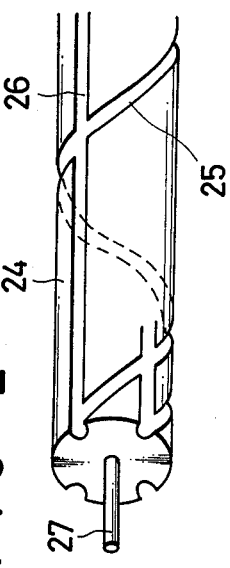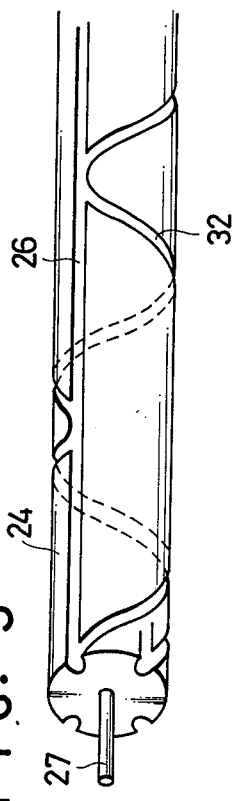

OPTICAL CABLE CONNECTING SECTION IN ELECTRIC POWER AND OPTICAL COMPOSITE CABLE

BACKGROUND OF THE INVENTION

This invention relates to an optical cable connecting section to be contained in an electric power and optical composite cable.

An example of a conventional submarine electric power and optical composite cable is shown in FIG. 5.

The composite cable in FIG. 5 has three electric power cables 11, an optical cable 12, an intermediate 13 made, for example, of jute, a retainer winding layer 14 made of a tape, a tension member 15 and an external sheath 16.

As apparent in FIG. 5, since the optical cable 12 is finer than the power cable 11, the optical cable 12 is ordinarily disposed in a slot between the adjacent power cables 11, so-called "shoulders" therebetween.

It is generally necessary to provide a connecting section of the power cable and a connecting section of the optical cable in the midway in such a submarine electric power and optical composite cable since the cable is lengthened. In this case, it is desired to form the outer diameters of the connecting sections substantially in the same diameter as those of the power cable or the optical cable so that the outer diameter of the entire cable does not vary in a longitudinal direction.

The power cables are heretofore connected in the same diameter.

However, the connecting sections of the optical cables must have excessive lengths by considering the correction when the connection of the optical fibers is mistaken, and the outer diameters of the connecting section of the optical cables become considerably larger than the outer diameters of the optical cables due to the accommodation of the excessive lengths therein.

As a result, the outer diameter of the cable of the portion which includes the connecting sections of the optical cables is locally increased to cause the laying work to become complicated, and an excessive external force might be additionally applied to the connecting sections of the optical cables.

SUMMARY OF THE INVENTION

Accordingly, an object of this invention is to provide optical cable connecting section in an electric power and optical composite cable which can eliminate the above-mentioned drawbacks and which is improved in the outer diameter of the connecting sections of the optical cables so as not to increase as large as the occurrence of a defect in its handling to be uniformly finished in the outer diameter of the cable over the entire length.

In order to achieve the above and other objects, there is provided according to the present invention a optical cable connecting section in an electric power and optical composite cable comprising a rodlike excessive length containing member having linear grooves and curved grooves on the outer periphery thereof and disposed between the ends of both of the optical cables to be connected, further connected in series with the tension members of the optical cables in such a manner that the optical fibers led from the end of both the optical cables are relatively connected as pairs of, whereby the excessive length portions of the optical cables thus connected are contained in the curved grooves of the excessive length containing member and the portions having no excessive length are contained in the linear grooves of the excessive length containing member.

In the optical cable connecting sections of the present invention, the optical fibers of the ends of both of the optical cables can be contained in the curved and linear grooves of the excessive length containing member.

More particularly, when in the connection of the optical cables is succeeded to be performed while the excessive length portions of the optical fibers remain as they are, the excessive length portions of the optical fibers are contained in the curved grooves of the excessive length containing member. When the excessive length portions of the optical fibers are consumed due to the reconnection or re-reconnection to overcome the connecting mistake, the portions having no excessive length of the optical fibers are contained in the linear grooves of the excessive length containing member.

Thus, the optical fibers thus connected are regularly contained in the grooves of the excessive length containing members.

The reason why the outer diameters of the connecting sections of the optical fibers can be reduced in the present invention is explained below.

When the excessive length containing member generally has a shape structure that the containing member is disposed on the outer periphery of the connecting sections of the optical cables, the radial size of the connecting section of the optical cable including the excessive length containing member unavoidably increases.

In the case of the present invention, the excessive length containing member is not disposed on the outer periphery of the connecting section of the optical cable, but the excessive length containing member is disposed between the ends of both of the optical cables. Therefore, the outer diameters of the connecting sections of the optical cables do not increase.

Further, since the excessive length containing member is formed in a rod shape having a sufficiently long size in a longitudinal direction, the curved grooves formed on the outer periphery of the excessive length containing member should be long. Thus, even if the outer diameter of the excessive length containing member does not so increase when the excessive length of the optical fiber having the length employed in general is provided, the excessive lengths of the optical fibers can be contained in the curved grooves. Consequently, it is not necessary to increase the outer diameter of the excessive length containing member.

In addition, the optical fibers contained in the curved grooves or in the linear grooves of the excessive length containing member are not extended bulky to the outer periphery of the excessive length containing member.

The outer diameters of the connecting sections of the optical fibers can be reduced by the composite effects as described above, and the outer diameter of the electric power and optical composite cable containing the connecting sections of the optical fibers does not locally increase.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 1 is a longitudinal sectional view schematically showing an embodiment of the connecting sections of optical cables according to the present invention;

FIGS. 2 and 3 are perspective views exemplifying various examples of excessive length containing member used in the embodiment;

DESCRIPTION OF THE PREFERRED EMBODIMENTS

Figure 4:
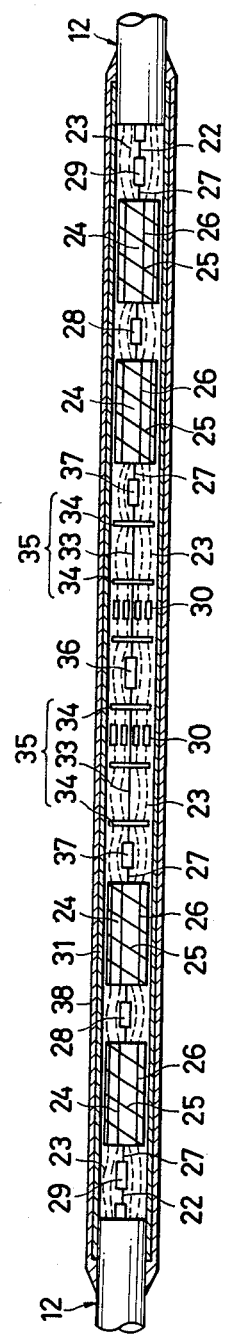
FIG. 4 is a longitudinal sectional view showing another embodiment of the connecting section of an optical cable according to the invention.
Figure 5:
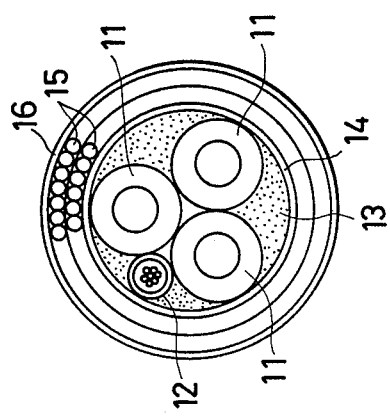
FIG. 5 is a lateral sectional view showing an example of a conventional electric power and optical composite cable.

Embodiments of an optical cable connecting section in an electric power and optical composits cable according to the present invention will be described in detail with reference to the accompanying drawings.

FIG. 1 shows an embodiment of the present invention.

In FIG. 1, the ends of metal sheaths 21 of both of optical cables 12 and 12 to be connected are exfoliated, and tension members 22 and optical fibers 23 of predetermined number are led from the ends of the metal sheaths 21 of the optical cables 12, 12.

The tension member 22 is cut near the end of the metal sheath 21, and the optical fiber 23 is provided with necessary excessive length for connection thereof.

Two rodlike excessive length containing members 24 are disposed coaxial with the optical cables 12, 13 at a suitable interval between the optical cables 12 and 12.

The excessive length containing member 24 has, as an example, a structure as shown in FIG. 2.

More specifically, the excessive length containing member 24 has curved grooves 25 and linear grooves 28 for containing the optical fibers 23, and a tension member 27 integrally formed at the center therof. The curved groove 25 of this case is formed of a spiral groove in one direction.

One curved groove 25 and one linear groove 28 form a set. In order to readily understand the grooves in FIG. 2, a set of the curved and linear grooves 25 and 28 are shown, but the number of sets of the curved and linear grooves 25 and 28 corresponds to that of the optical fibers 23.

Those of the tension members 27 of both of the excessive length containing members 24, 24, oppositely disposed at the center between the ends of both of the optical cables 12 and 12 are relatively connected with each other, and those of the tension members 27 of both of the excessive length containing members 24, 24, disposed at the end sides of the cables 12, 12 are connected oppositely to the tension member 22 of the optical cable 12, thereby forming the connecting portions 28, 28 of the tension members.

The optical fibers 23 led from the ends of both of the optical cables 12, 12 form a pair, and are connected at the center between the ends of both of the cables 12 and 12, i.e., between the two excessive length containing members 24 and 24, thereby forming the connecting sections 30 of the optical fibers 23.

When the optical fibers are first connected in the connections of the optical fibers as described above, the excessive length portions of the optical fibers 23 are connected as predetermined in the state that the excessive length portions of the optical fibers 23, since having the excessive length portions, are contained in the curved grooves 25.

When the excessive length portions of the optical fibers are succeeded to be connected at first, the connected optical fibers 23 are contained in the curved grooves 25 of the excessive length containing member as they are.

When the first connection of the optical fibers to the curvede grooves of the excessive length containing member is failed, the optical fibers 23 are drawn in the length necessary to next connect from the curved grooves 25, and second connection of the optical fibers is performed in the state that the drawn optical fibers 23 are moved to the linear grooves 26.

Thus, when the connection is failed, some times of the connections can be again performed until the optical fibers 23 in the curved grooves 25 are all drawn to be shifted to the linear grooves 28, i.e., all the excessive lengths of the optical fibers are wasted out.

After the connection of the optical fibers 23 is completed, a connecting conduit 31 is covered to cross between the metal cases 21 and 21 of the optical cables, and both ends of the connecting conduit 31 are fixedly secured by bonding or welding to the metal cases 21, 21, respectively.

FIG. 3 shows another example of the excessive length containing member 24.

The excessive length containing member 24 of FIG. 3 also has linear grooves 26 and curved grooves 32 formed on the outer periphery thereof. The curved grooves 32 of this example are formed of SZ spiral grooves inverted at every suitable turn in its direction.

In the example in FIG. 3, the curved groove 32 is inverted in its SZ spiral direction at every one turn. However, it is noted that the curved groove 32 may be inverted in its SZ spiral direction at less than one tur.

Thus, even after the optical fibers 23 are connected, the optical fibers can be contained in the curved grooves (spiral grooves).

In case of unidirectional spiral grooves (curved grooves 25), the optical fibers can be contained in the grooves even after the connection of the optical fibers when the spiral grooves are inverted in their directions on right and left excessive length containing members 24, 24.

When the number of connecting the optical fibers is different, the optical fiber contained in the curved groove and the optical fiber contained in the linear groove might be crossed.

In order not to apply a side pressure to the optical fibers to be superposed to each other in this crossing portion, it is preferable to form the curved grooves and the linear grooves in different depths of the size larger than the outer diameter of the optical fiber.

FIG. 4 shows another embodiment of the present invention.

In the embodiment in FIG. 4, two excessive length containing members 24 are connected to the end sides of the optical fibers 12 and 12 to totally provide four excessive length containing members 24 between the ends of both of the optical cables 12 and 12, and one connecting excessive length is contained in each of the excessive length containing members 24.

In the embodiment in FIG. 4, one connecting excessive length can be obtained by all shifting the optical fiber 23 failed in its connection from the curved groove 25 to the linear groove 26 of its set to it.

Therefore, the step of confirming by a worker of the length of the optical fiber 23 whenever the connection is failed can be omitted.

In the embodiment in FIG. 4, since two excessive length containing members are provided at the end sides of the optical fibers 12, 12, twice misconnections may be allowed.

In the embodiment in FIG. 4, the interval of the two excessive length containing members 24, 24 disposed at the center side is largely set between the ends of both of the optical cables 12 and 12, and a plurality of axial center holders 25 integrated with a tension member 33 and a disclike spacer 34 may be aligned to be interposed between the excessive length containing members 24 and 24.

The tension members 33 of the axial center holders 35 disposed in the longitudinal intermediate of the axial center holder row are connected at the connecting portions 36 of the tension members 33, and the tension members 33 of the axial center holders 25 disposed at both of longitudinal ends and the tension members 27 of the excessive length containing members 24 are connected at the connecting portions 37.

When a plurality of axial center holders 35 are provided between the two excessive length containing members 24 and 24 at the center side in this manner, a slack may be formed at the optical fiber 23 between the spacers 34 of the axial center holders 35, and the connecting sections 30 of the optical fibers 23 can be longitudinally displaced.

In addition, in the embodiment in FIG. 4, the outer periphery of the conduit 31 is covered with a rubber or plastic corrosionproof conduit 38 on the outer periphery of the connecting conduit 31.

In order to prevent the optical fibers 23 from being contacted with the connecting conduit 31, though not shown, a retainer winding layer of a tape may be formed inside the connecting conduit 31, and jelly may be filled in the connecting conduit 31 so as to suppress the movement of the optical fiber to some degree.

In the embodiments described above, the shape of the curved groove may employ any shape, if the optical fiber can be contained in allowable curvature (e.g., radius of curvature R=40 mm) or larger in the curved groove, and is generally preferably in unidirectional spiral groove or SZ spiral groove inverted in its direction within one turn.

According to the present invention as described above, the excessive lengths of the optical fibers can be contained by disposing the rodlike excessive length containing members having linear and curved grooves on the outer periphery thereof between the ends of both the optical fibers to be connected to obtain the connecting sections of the optical fibers in relatively small diameter even if the connection is failed.

Therefore, when the optical fibers having such connecting sections are contained in the electric power and optical composite cable, the outer diameter of the electric power and optical composite cable is not locally increased due to the connecting sections of the optical fibers, thereby obtaining the electric power and optical composite cable having uniform outer diameter in the entire length.

What is claimed is:

1. An optical cable connecting section in an electric power and optical composite cable comprising a rodlike excessive length containing member having linear grooves and curved grooves on the outer periphery thereof and disposed between the ends of both the optical cables to be connected, further connected in series with the tension members of the optical cables in such a manner that the optical fibers led from the end of both of the optical cables are relatively connected as pairs, whereby the excessive length portions of the optical cables thus connected are contained in the curved grooves of the excessive length containing member and the portions having no excessive length are contained in the linear grooves of the excessive length containing member.

2. The optical cable connecting section in an electric power and optical composite cable according to claim 1, wherein a plurality of excessive length containing members are disposed on one row at a relative interval between the ends of said optical cables to be connected, connected in series to the tension members of both of the optical cables, the optical cables led from the ends of both the optical cables form pairs, are relatively connected between the adjacent portions of the excessive length containing members in such a manner that the excessive length portions of the optical fibers thus connected are contained in the curved grooves of the excessive length containing members, and the portions having no excessive length are contained in the linear grooves of the excessive length containing members.

3. The optical cable connecting section in an electric power and optical composite cable according to claim 2, wherein even number of the excessive length containing members are disposed in one row between the ends of both of the optical fibers to be connected.

4. The optical cable connecting section in an electric power and optical composite cable according to claim 1, wherein the depths of the curved grooves and the linear grooves of said excessive length containing members are different from each other.

5. The optical cable connecting section in an electric power and optical composite cable according to claim 1, wherein the curved grooves of said excessive length containing member are formed of unidirectional spiral grooves.

6. The optical cable connecting section in an electric power and optical composite cable according to claim 1, wherein the curved grooves of said excessive length containing member are formed of SZ spiral grooves inverted in its direction within one turn or less.

7. The optical cable connecting section in an electric power and optical composite cable according to claim 1, wherein a plurality of curved grooves are formed on the excessive length containing member.

8. The optical cable connecting section in an electric and optical composite cable according to claim 2, wherein the depths of the curved grooves and the linear grooves of said excessive length containing members are different from each other.

9. The optical cable connecting section in an electric power and optical composite cable according to claim 3, wherein the depths of the curved grooves and the linear grooves of said excessive length containing members are different from each other.

10. The optical cable connecting section in an electric power and optical composite cable according to claim 2, wherein the curved groves of said excessive length containing member are formed of unidirectional spiral grooves.

11. The optical cable connecting section in an electric power and optical composite cable according to claim 3, wherein the curved grooves of said excessive length containing member are formed of unidirectional spiral grooves.

12. The optical cable connecting section in an electric power and optical composite cable according to claim 4, wherein the curved grooves of said excessive length containing member are formed of unidirectional spiral grooves.

13. The optical cable connecting section in an electric power and optical composite cable according to claim 2, wherein the curved grooves of said excessive length containing member are formed of SZ spiral grooves inverted in its direction within one turn or less.

14. The optical cable connecting section in an electric power and optical composite cable according to claim 3, wherein said the curved grooves of said excessive length containing member are formed of SZ spiral grooves inverted in its direction within one turn or less.

15. The optical cable connecting section in an electric power and optical composite cable according to claim 4, wherein the curved grooves of said excessive length containing member are formed of SZ spiral grooves inverted in its direction within one turn or less.

16. The optical cable connecting section in an electric power and optical composite cable according to claim 2, wherein a plurality of curved grooves are formed on the excessive length containing member.

17. The optical cable connecting section in an electric power and optical composite cable according to claim 3, wherein a plurality of curved grooves are formed on the excessive length containing member.

18. The optical cable connecting section in an electric power and optical composite cable according to claim 4, wherein a plurality of curved grooves are formed on the excessive length containing member.

19. The optical cable connecting section in an electric power and optical composite cable according to claim 5, wherein a plurality of curved grooves are formed on the excessive length containing member.

20. The optical cable connecting section in an electric power and optical composite cable according to claim 6, wherein a plurality of curved grooves are formed on the excessive length containing member.

* * * * *